(12) United States Patent
Wang et al.

(10) Patent No.: US 12,743,000 B2

(45) Date of Patent: Sep. 22, 2026

(54) WHISPERING GALLERY MODE RESONATOR BASED ON CYLINDRICAL CAVITY IN OPTICAL FIBER AND FABRICATION METHOD THEREOF

(71) Applicant: Shenzhen Technology University, Guangdong (CN)

(72) Inventors: Dongning Wang, Guangdong (CN); Yongli Mei, Guangdong (CN); Qiaoben Wang, Guangdong (CN)

(73) Assignee: SHENZHEN TECHNOLOGY UNIVERSITY, Guangdong (CN)

( * ) Notice: Subject to any disclaimer, the term of this patent is extended or adjusted under 35 U.S.C. 154(b) by 543 days.

(21) Appl. No.: 18/231,399

(22) Filed: Aug. 8, 2023

(65) Prior Publication Data

US 2024/0295794 A1 Sep. 5, 2024

(30) Foreign Application Priority Data

Mar. 3, 2023 (CN) ......................... 202310198618.2

(51) Int. Cl.
*G02F 1/39* (2006.01)

(52) U.S. Cl.
CPC .................................... *G02F 1/395* (2013.01)

(58) Field of Classification Search
CPC ............................... G02F 1/395; G02F 1/2252
See application file for complete search history.

(56) References Cited

U.S. PATENT DOCUMENTS

2024/0159968 A1* 5/2024 Yang .................. G02B 6/29341

FOREIGN PATENT DOCUMENTS

| | | | |
|---|---|---|---|
| CN | 104932057 | | 9/2015 |
| CN | 105158854 | | 12/2015 |
| CN | 211236336 U | * | 8/2020 |
| CN | 112558228 | | 3/2021 |

* cited by examiner

*Primary Examiner* — Dennis P Joseph

(74) *Attorney, Agent, or Firm* — Terry M. Sanks, Esq.; Beusse Sanks, PLLC

(57) ABSTRACT

A whispering gallery mode resonator based on a cylindrical cavity in an optical fiber and a fabrication method thereof are disclosed, which belong to the technical field of optical fiber application. The whispering gallery mode resonator includes an optical fiber body, a cylindrical cavity is provided in the optical fiber body, a top end of the cylindrical cavity is i open, and a bottom end of the cylindrical cavity is located inside the optical fiber body. Part or all of the cylindrical cavity blocks a part of transmitted beam of the optical fiber body, such that the part of the transmitted beam of the optical fiber body is coupled to an inner wall of the cylindrical cavity in a tangential direction, and then periodically propagates on the inner wall of the cylindrical cavity to form a whispering gallery mode.

17 Claims, 4 Drawing Sheets

WHISPERING GALLERY MODE RESONATOR BASED ON CYLINDRICAL CAVITY IN OPTICAL FIBER AND FABRICATION METHOD THEREOF

CROSS-REFERENCE TO RELATED APPLICATION

This patent application claims the benefit and priority of Chinese Patent Application No. 2023101986182 filed with the China National Intellectual Property Administration on Mar. 3, 2023, the disclosure of which is incorporated by reference herein in its entirety as part of the present application.

TECHNICAL FIELD

The present disclosure belongs to the technical field of optical fiber application, in particular to a whispering gallery mode resonator based on a cylindrical cavity in an optical fiber and a fabrication method thereof.

BACKGROUND

Light in a whispering gallery mode (WGM) resonator propagates in a closed cavity and is totally reflected in the cavity at the same angle. After a circle of propagation, when satisfying a certain phase matching condition, optical wave paths can be superimposed and enhanced to form a standing wave field and form an optical amplification effect. Whispering gallery mode (WGM) resonators are widely used in optical filters, modulators, micro laser, frequency comb generators, nonlinear optics and high-sensitivity sensor devices due to their high-quality factor (Q), small mode size, narrow linewidth, long photon lifetime and low power consumption.

At present, the common microcavity types of the WGM resonators mainly include: a microsphere cavity, a microbubble cavity, a micro-ring cavity, a micro-disk cavity, a micro-ring core cavity, a microtube cavity, a bottle-neck cavity and so on. Each microcavity type has its own advantages and disadvantages. However, the above microcavity type WGM resonators are mostly discrete optical devices, which cannot be directly coupled with incident light radiation. External coupling schemes such as a tapered fiber, a side-polished fiber, a waveguide or a prism are required. This creates difficulties when it is necessary to use the WGM resonators in the optical fiber system.

Therefore, a miniature WGM resonator integrated in the optical fiber and easily coupled by light propagating in the optical fiber core and a related fabrication method are urgently needed in practice. At present, such devices have not appeared in the market.

SUMMARY

An objective of embodiments of the present disclosure is to solve the technical problems existing in the prior art, and provides a whispering gallery mode resonator based on a cylindrical cavity in an optical fiber and a fabrication method thereof. The WGM resonator is fabricated by femtosecond laser etching and rapid hydrofluoric acid etching. The WGM resonator based on the cylindrical cavity is fully integrated with the optical fiber, which can directly couple the light propagating in the optical fiber core, thus paving the way for multiple promising applications in the fields of micro-lasers and nonlinear optics.

The technical solution adopted to achieve the above objective is as follows.

A whispering gallery mode resonator based on a cylindrical cavity in an optical fiber includes an optical fiber body. A cylindrical cavity is provided in the optical fiber body, and a central axis of the cylindrical cavity is perpendicular to that of the optical fiber body. A top end of the cylindrical cavity is open, and a bottom end of the cylindrical cavity is located inside the optical fiber body. Part or all of the cylindrical cavity blocks part of transmitted light beam of the optical fiber body, so that the part of transmitted light beam of the optical fiber body is coupled to an inner wall of the cylindrical cavity in a tangential direction, and then periodically propagates on the inner wall of the cylindrical cavity to form a whispering gallery mode.

Preferably, when the optical fiber body is a multi-mode optical fiber, a diameter of the cylindrical cavity is smaller than a diameter of a multi-mode optical fiber core, and the bottom end of the cylindrical cavity is located in the multi-mode optical fiber core.

Preferably, the central axis of the cylindrical cavity intersects with and is perpendicular to a central axis of the multi-mode optical fiber.

Preferably, when the optical fiber body is a single-mode optical fiber, a diameter of the cylindrical cavity is not less than a diameter of a single-mode optical fiber core, the cylindrical cavity is arranged eccentrically with respect to the single-mode optical fiber, and part of a side surface and part of a bottom surface of the cylindrical cavity are located in the single-mode optical fiber core.

Preferably, multiple cylindrical cavities are provided, and the multiple cylindrical cavities are arranged sequentially in a light transmission direction in the optical fiber body.

Preferably, the diameters of the plurality of cylindrical cavities are not exactly the same.

A fabrication method for the whispering gallery mode resonator is further disclosed, which includes the following steps:

- step A: performing a femtosecond laser micromachining process, including: placing the optical fiber body on a three-dimensional micro-displacement platform controlled by computer software, monitoring the micromachining process by a Charge Coupled Device (CCD) camera; after a focusing adjustment between the optical fiber body and a femtosecond laser device is completed, etching, by a femtosecond laser pulse, a ring structure with a required diameter on a surface of the optical fiber; after the etching the ring structure is completed, moving a femtosecond laser beam in steps at an interval of 2 μm upwards an inside of the optical fiber body to continuously etch a same ring structure, and sequentially moving the optical fiber body step by step for etching until a cylindrical structure with a required depth is etched;
- step B: performing a corrosion process by using hydrofluoric acid solution, including: connecting one end of the optical fiber body to a red laser pointer, and finding out a waveguide position in the optical fiber body through red light display, that is, the position of the cylindrical structure, and then immersing a portion of the optical fiber body where the cylindrical structure is located in the hydrofluoric acid solution for corrosion for a period of time; and
- step C: putting the cylindrical cavity subjected to the corrosion in the step B into an ultrasonic cleaning machine for cleaning for a certain period of time, thus smoothing an inner wall of the cylindrical cavity to facilitate forming of a whispering gallery mode.

Preferably, the step A further includes the following steps: step A1: driving, by the three-dimensional micro-displacement platform, the optical fiber body to move in an axial direction by a predetermined distance after etching a first cylindrical structure is completed, repeating etching the first cylindrical structure to complete etching of a second cylindrical structure, and repeating the etching to complete etching all cylindrical structures, thereby forming a cascaded whispering gallery mode structure on the optical fiber body. Diameters of the cylindrical structures are not exactly the same.

Preferably, when multiple cylindrical structures are fabricated, the step A further includes the following steps: in the step A, the optical fiber body is a multi-mode fiber, a femtosecond laser device has a central wavelength of 800 nm, a pulse energy of 500 μJ, a pulse duration of 35 fs, a repetition frequency of 5 kHz, and a laser beam scanning speed of 10 μm/s.

Preferably, in the step B, the portion of the optical fiber body where the cylindrical structure is located is immersed in the hydrofluoric acid solution with a concentration of 40% for corrosion for 150 s.

The present disclosure has the following beneficial effects. (1) The whispering gallery mode resonator is a WGM (whispering gallery mode) resonator based on a cylindrical cavity and completely integrated with an optical fiber, which can directly couple light propagating in an optical fiber core, thus paving the way for multiple promising applications in the fields of micro lasers, nonlinear optics and the like.

(2) The cylindrical cavity is formed by improving the structure of the optical fiber body itself, the cylindrical cavity is integrated in the optical fiber and does work with other components. Therefore, the device is solid and stable.

(3) The whispering gallery mode resonator has the advantages of low cost, simple fabrication technology, high integration and high Q value. Experimental results show that a quality factor (Q) of the resonator is $1.06\times10^4$, which provides a new direction for the development of integrated optics and optical cores.

(4) The fabrication method for the whispering gallery mode resonator has the characteristics of simplicity, rapidity, flexibility and stable operation, through which the cascaded whispering gallery mode structure can be simply and effectively fabricated, thus improving the application potential of the system.

DETAILED DESCRIPTION OF THE EMBODIMENTS

The present disclosure is further described below with reference to the accompanying drawings.

Specific Embodiment I

As shown in FIGS. 1-4, a whispering gallery mode resonator based on a cylindrical cavity in an optical fiber includes an optical fiber body, a cylindrical cavity 4 is provided in the optical fiber body, and a central axis of the cylindrical cavity 4 is perpendicular to that of the optical fiber body. A top end of the cylindrical cavity 4 is open, and a bottom end of the cylindrical cavity 4 is located inside the optical fiber body. Part or all of the cylindrical cavity 4 blocks part of transmitted light beam in the optical fiber body, such that the part of the transmitted light beam of the optical fiber body is coupled to an inner wall of the cylindrical cavity 4 along a tangential direction in the form of evanescent wave or in the form of direct coupling, and then periodically propagates on the inner wall of the cylindrical cavity 4 to form a whispering gallery mode resonance in the cylindrical cavity 4.

Figure 1:
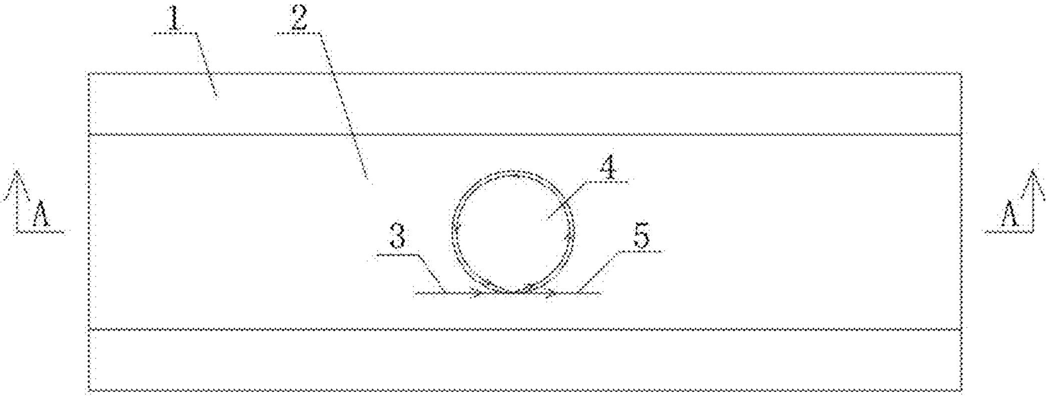
FIG. 1 is a schematic structure diagram of a multi-mode optical fiber whispering gallery mode resonator in accordance with a specific embodiment I.
Figure 2:
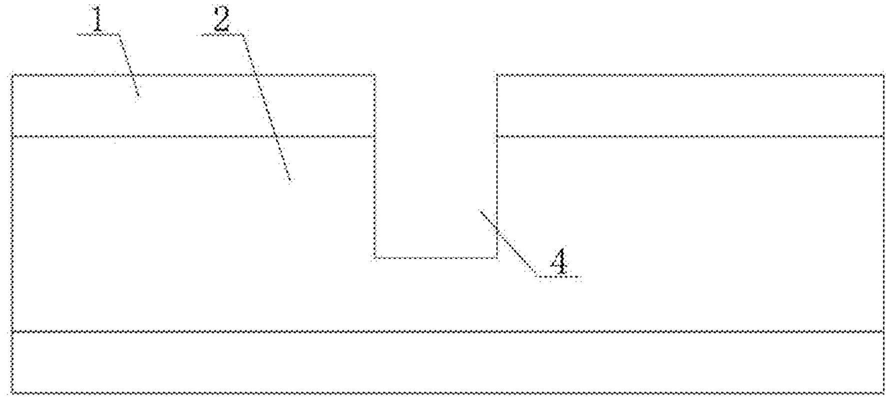
FIG. 2 is a schematic diagram of a sectional structure along A-A in FIG. 1.
Figure 3:
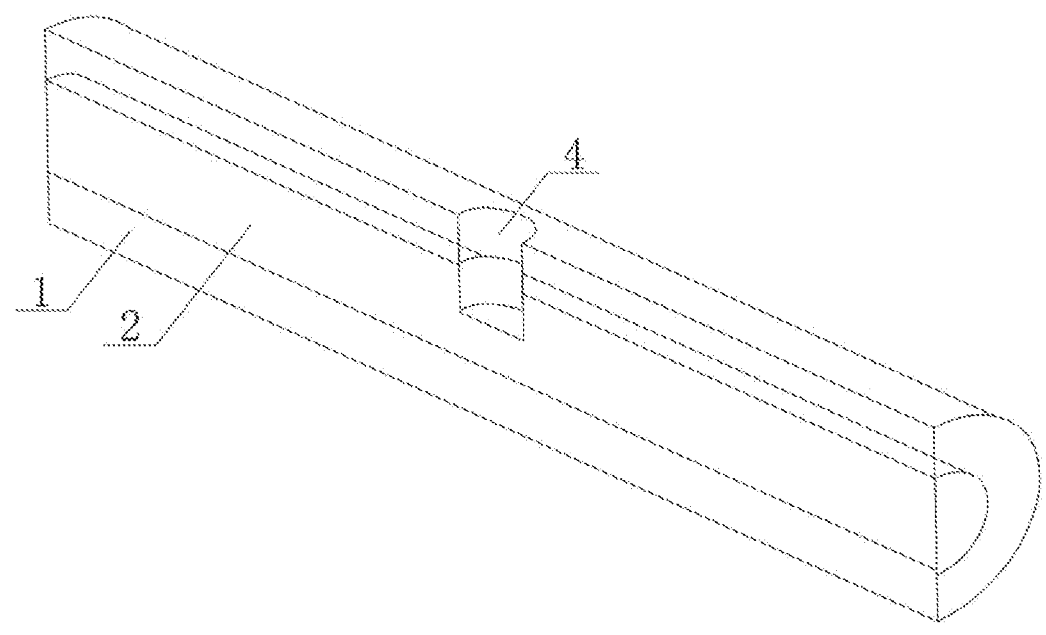
FIG. 3 is a schematic diagram of a three-dimensional structure in FIG. 2.

As shown in FIG. 1, when the optical fiber body is a multi-mode optical fiber, a diameter of the cylindrical cavity 4 is smaller than that of a multi-mode optical fiber core 2, and the cylindrical cavity 4 penetrates a multi-mode optical fiber cladding 1 from top to bottom and then is embedded in the multi-mode optical fiber core 2. The bottom end of the cylindrical cavity 4 is located in the multi-mode optical fiber core, and the central axis of the cylindrical cavity 4 is perpendicular to a central axis of the multi-mode optical fiber core 2.

The multi-mode optical fiber may be replaced with a coreless optical fiber. For the multi-mode fiber and the coreless optical fiber both, they are in multi-mode transmission, the cross sections of the transmitted light beams therein are relatively large, and the cylindrical cavities 4 for the both are all located within the transmitted light beam, the working processes and working principles for the both are the same.

Specific Embodiment II

Figure 5:
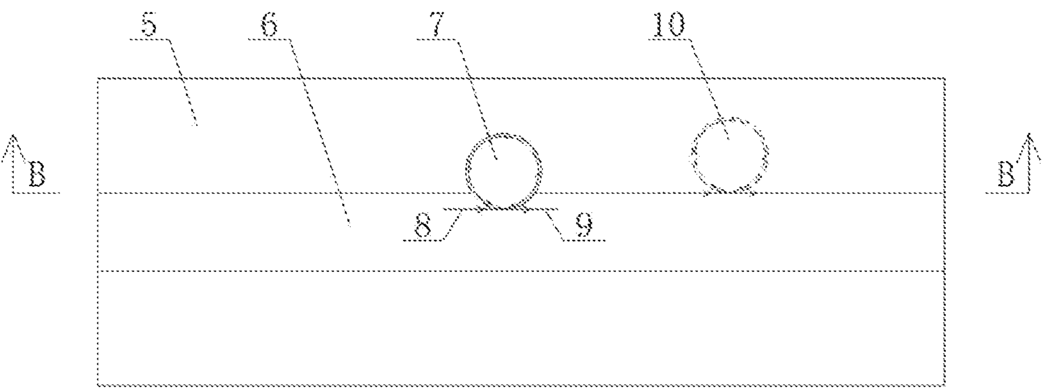
FIG. 5 is a schematic structure diagram of a single-mode optical fiber whispering gallery mode resonator in accordance with a specific embodiment II.
Figure 6:
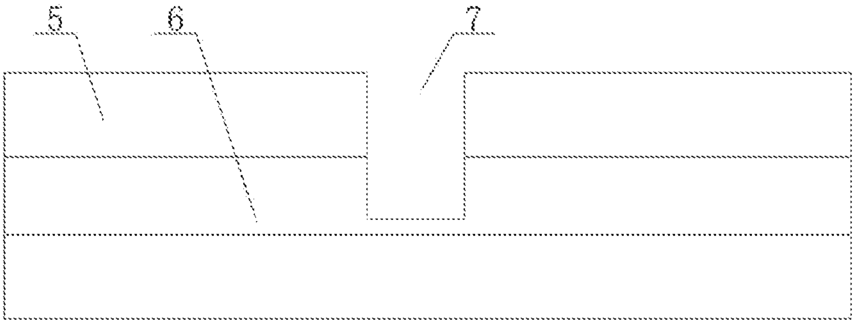
FIG. 6 is a schematic diagram of a sectional structure along B-B in FIG. 6.

As shown in FIG. 5 and FIG. 6, when the optical fiber body is a multi-mode optical fiber, as a single-mode optical fiber cladding 5 is relatively thick and a diameter of the single-mode optical fiber core 6 is relatively small, if the cylindrical cavity 7 in the specific embodiment II is all located in the single-mode optical fiber core 6, the diameter of the cylindrical cavity 7 should be less than 10 μm, which requires high fabrication technology. In this case, the diameter of the cylindrical cavity 7 may be designed to be not less than the diameter of the single-mode optical fiber core 6. In this case, the cylindrical cavity 7 is eccentrically arranged with respect to the single-mode optical fiber, and part of side surface and part of bottom surface of the cylindrical cavity 7 are located in the single-mode optical fiber core 6. Meanwhile, the cylindrical cavity 10 may be arranged tangent to the single-mode optical fiber core 6.

In this embodiment, when the whispering gallery mode resonator works, upon reaching the cylindrical cavity 7, the transmitted red-light beam 8 in the single-mode optical fiber core 6 is coupled to the inner wall of the cylindrical cavity 7 for periodic transmission, and then the whispering gallery mode is formed.

Specific Embodiment III

Figure 7:
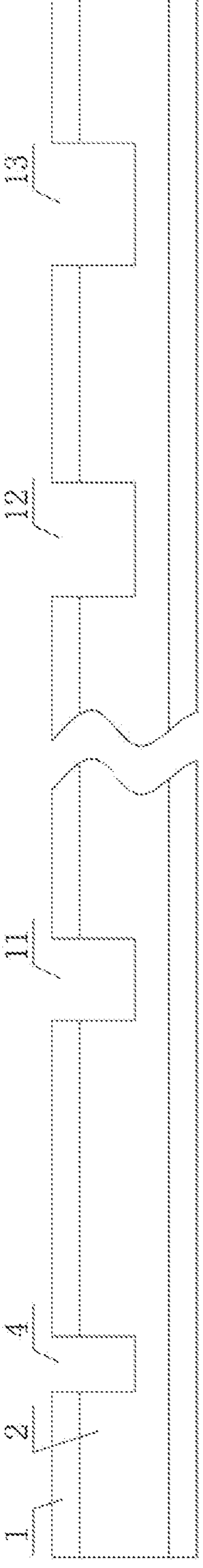
FIG. 7 is a schematic structure diagram of an optical fiber body with a multi-stage series cylindrical cavity structure.

As shown in FIG. 7, the difference from the above two specific embodiments is that multiple cylindrical cavities 4, 11, 12, 13 are provided, which are sequentially arranged in a light transmission direction in a multi-mode optical fiber. The diameters of the multiple cylindrical cavities 4, 11, 12 and 13 are not exactly the same, thereby forming a cascaded whispering gallery mode structure on the multi-mode optical fiber, which can multiplex the multiple resonators on a single optical fiber and expand and enrich the application range of a device.

The present disclosure discloses a fabrication method for the whispering gallery mode resonator as described above, which includes the following steps A-C.

In step A, a femtosecond laser micromachining process is performed. Specifically, an optical fiber body is placed on a three-dimensional micro-displacement platform controlled by computer software, the micromachining process is monitored through a CCD camera; after a focusing adjustment between the optical fiber body and a femtosecond laser device is completed, a femtosecond laser pulse etches a ring structure with a required diameter on a surface of the optical fiber. After etching the ring structure is completed, a femtosecond laser beam moves in steps at an interval of 2 μm upwards an inside of the optical fiber body to continuously etch the same ring structure, and the femtosecond laser beam sequentially moves step by step for etching until a cylindrical structure with a required depth is etched.

In step B, corrosion process using hydrofluoric acid solution is performed. Specifically, one end of the optical fiber body is connected to a red laser pointer, a waveguide position in the optical fiber body, i.e., a position of the cylindrical structure, is found out through red light display, and then a small amount of the hydrofluoric acid solution is dripped at the position of the cylindrical structure for immersing and corrosion for a period of time.

Figure 4:
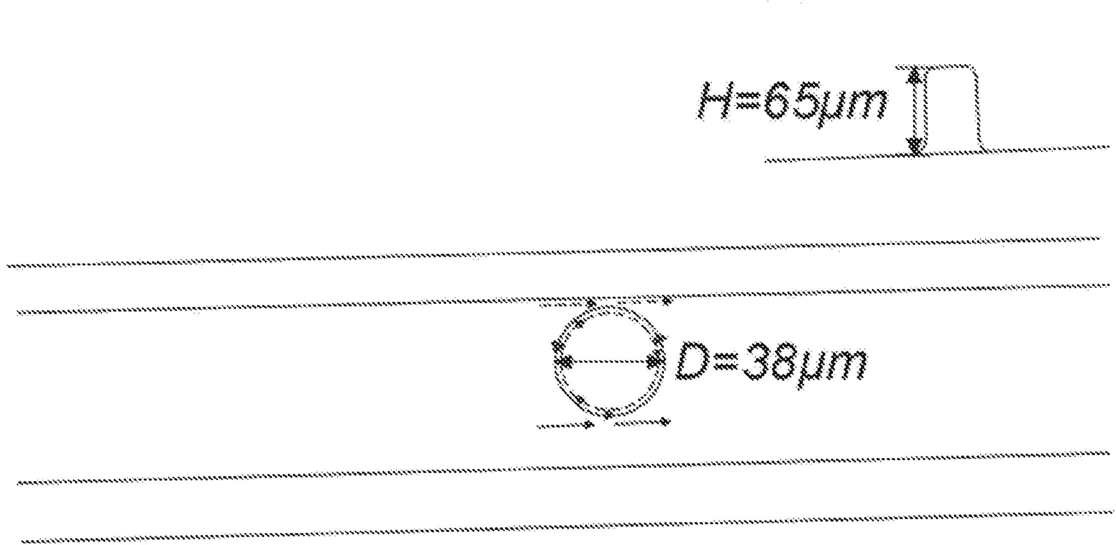
FIG. 4 is a microscope magnification image of the multi-mode optical fiber whispering gallery mode resonator in accordance with a specific embodiment I.

In step C, the cylindrical cavity subjected to corrosion process in the step B is put into an ultrasonic cleaning machine for cleaning for a certain period of time, thus smoothing an inner wall of the cylindrical cavity to facilitate the forming of a whispering gallery mode. FIG. 4 is a microscopic enlarged schematic diagram of a multi-mode optical fiber whispering gallery mode resonator. As shown in FIG. 4, the cylindrical cavity has a diameter of 38 μm and a depth of 65 μm.

In the step A, the optical fiber body is a multi-mode fiber, the femtosecond laser device has a central wavelength of 800 nm, a pulse energy of 500 μJ, a pulse duration of 35 fs, and a repetition frequency of 5 kHz; and a scanning speed of a laser beam is 10 μm/s. In the step B, the hydrofluoric acid solution with the concentration of 40% is dripped at the position of the cylindrical structure for immersing and corrosion for 150 s.

Further, when a cascaded whispering gallery mode structure is fabricated, the step A further includes step A1.

In step A1, after etching a first cylindrical structure is completed and the three-dimensional micro-displacement platform drives the optical fiber body to move in an axial direction by a predetermined distance, a step of etching the first cylindrical structure is repeated to complete the etching of a second cylindrical structure, and the etching step is repeated until the etching of all cylindrical structures is completed, thereby forming a cascaded whispering gallery mode structure on the optical fiber body. The diameters of various cylindrical structures are not exactly the same.

Finally, it should be noted that the above embodiments are only used to illustrate the technical solution of the present disclosure, but not to limit it; Although the present disclosure has been described in detail with reference to the foregoing embodiments, it should be understood by those of ordinary skill in the art that the technical solution described in the foregoing embodiments can still be modified or some technical features thereof can be equivalently replaced. These modifications or substitutions do not depart the essence of the corresponding technical solution from the spirit and scope of the technical solution of the embodiments of the present disclosure.

What is claimed is:

1. A fabrication method for a whispering gallery mode resonator based on a cylindrical cavity in an optical fiber, comprising:

step A: performing a femtosecond laser micromachining process, comprising: placing an optical fiber body on a three-dimensional micro-displacement platform controlled by computer software, monitoring the micromachining process through a Charge Coupled Device (CCD) camera; after a focusing adjustment between the optical fiber body and a femtosecond laser device is completed, etching, by a femtosecond laser pulse, a ring structure with a required diameter on a surface of the optical fiber; after the etching the ring structure is completed, moving a femtosecond laser beam in steps at an interval of 2 μm upwards an inside of the optical fiber body to continuously etch a same ring structure, and sequentially moving the optical fiber body step by step for etching until a cylindrical structure with a required depth is etched;

step B: performing a corrosion process by using hydrofluoric acid solution, comprising: connecting one end of the optical fiber body to a red laser pointer, and finding out a waveguide position in the optical fiber body through red light display, that is, the position of the cylindrical structure, and then immersing a portion of the optical fiber body where the cylindrical structure is located in the hydrofluoric acid solution for corrosion for a period of time; and step C: putting the cylindrical cavity subjected to the corrosion in the step B into an ultrasonic cleaning machine for cleaning for a certain period of time, thus smoothing an inner wall of the cylindrical cavity to facilitate forming of a whispering gallery mode;

wherein the whispering gallery mode resonator comprises:

the optical fiber body, wherein the cylindrical cavity is provided in the optical fiber body, a central axis of the cylindrical cavity is perpendicular to a central axis of the optical fiber body, a top end of the cylindrical cavity is open, a bottom end of the cylindrical cavity is located inside the optical fiber body, part or all of the cylindrical cavity blocks part of transmitted light beam of the optical fiber body, so that the part of transmitted light beam of the optical fiber body is coupled to the inner wall of the cylindrical cavity in a tangential direction, and then periodically propagates on the inner wall of the cylindrical cavity to form the whispering gallery mode.

2. The fabrication method for the whispering gallery mode resonator according to claim 1, wherein when the optical fiber body is a multi-mode optical fiber, a diameter of the cylindrical cavity is smaller than a diameter of a multi-mode optical fiber core, and the bottom end of the cylindrical cavity is located in the multi-mode optical fiber core.

3. The fabrication method for the whispering gallery mode resonator according to claim 2, wherein the central axis of the cylindrical cavity is perpendicular to a central axis of the multi-mode optical fiber.

4. The fabrication method for the whispering gallery mode resonator according to claim 3, wherein a plurality of cylindrical cavities are provided, and the plurality of cylindrical cavities are arranged sequentially in a light transmission direction in the optical fiber body.

5. The fabrication method for the whispering gallery mode resonator according to claim 4, wherein diameters of the plurality of cylindrical cavities are not exactly the same.

6. The fabrication method for the whispering gallery mode resonator whispering gallery mode resonator according to claim 2, wherein a plurality of cylindrical cavities are provided, and the plurality of cylindrical cavities are arranged sequentially in a light transmission direction in the optical fiber body.

7. The fabrication method for the whispering gallery mode resonator according to claim 6, wherein diameters of the plurality of cylindrical cavities are not exactly the same.

8. The fabrication method for the whispering gallery mode resonator according to claim 1, wherein when the optical fiber body is a single-mode optical fiber, a diameter of the cylindrical cavity is not less than a diameter of a single-mode optical fiber core, the cylindrical cavity is arranged eccentrically with respect to the single-mode optical fiber, and part of a side surface and part of a bottom surface of the cylindrical cavity are located in the single-mode optical fiber core.

9. The fabrication method for the whispering gallery mode resonator according to claim 8, wherein a plurality of cylindrical cavities are provided, and the plurality of cylindrical cavities are arranged sequentially in a light transmission direction in the optical fiber body.

10. The fabrication method for the whispering gallery mode resonator according to claim 9, wherein diameters of the plurality of cylindrical cavities are not exactly the same.

11. The fabrication method for the whispering gallery mode resonator according to claim 1, wherein a plurality of cylindrical cavities are provided, and the plurality of cylindrical cavities are arranged sequentially in a light transmission direction in the optical fiber body.

12. The fabrication method for the whispering gallery mode resonator according to claim 11, wherein diameters of the plurality of cylindrical cavities are not exactly the same.

13. The fabrication method for the whispering gallery mode resonator according to claim 1, wherein when a plurality of cylindrical structures are fabricated, the step A further comprises:

step A1: driving, by the three-dimensional micro-displacement platform, the optical fiber body to move in an axial direction by a predetermined distance after etching a first cylindrical structure is completed, repeating the etching the first cylindrical structure to complete etching of a second cylindrical structure, and repeating the etching to complete etching of all cylindrical structures, thereby forming a cascaded whispering gallery mode structure on the optical fiber body, wherein diameters of the cylindrical structures are not exactly the same.

14. The fabrication method for the whispering gallery mode resonator according to claim 13, wherein in the step A, the optical fiber body is a multi-mode fiber, a femtosecond laser device has a central wavelength of 800 nm, a pulse energy of 500 μJ, a pulse duration of 35 fs, a repetition frequency of 5 kHz, and a scanning speed of a laser beam is 10 μm/s.

15. The fabrication method for the whispering gallery mode resonator according to claim 14, wherein in the step B, the portion of the optical fiber body where the cylindrical structure is located is immersed in the hydrofluoric acid solution with a concentration of 40% for corrosion for 150 s.

16. The fabrication method for the whispering gallery mode resonator according to claim 1, wherein in the step A, the optical fiber body is a multi-mode fiber, a femtosecond laser device has a central wavelength of 800 nm, a pulse energy of 500 μJ, a pulse duration of 35 fs, a repetition frequency of 5 kHz, and a scanning speed of a laser beam is 10 μm/s.

17. The fabrication method for the whispering gallery mode resonator according to claim 16, wherein in the step B, the portion of the optical fiber body where the cylindrical structure is located is immersed in the hydrofluoric acid solution with a concentration of 40% for corrosion for 150 s.

* * * * *